United States Patent [19]

Tanaka

[11] Patent Number: 4,952,805

[45] Date of Patent: Aug. 28, 1990

[54] METHOD OF JUDGING THE PRESENCE OR ABSENCE OF A LIMITED IRRADIATION FIELD, METHOD OF SELECTING A CORRECT IRRADIATION FIELD, AND METHOD OF JUDGING CORRECTNESS OR INCORRECTNESS OF AN IRRADIATION FIELD

[75] Inventor: Nobuyuki Tanaka, Kanagawa, Japan

[73] Assignee: Fuji Photo Film Co., Ltd., Kanagawa, Japan

[21] Appl. No.: 234,784

[22] Filed: Aug. 22, 1988

[30] Foreign Application Priority Data

Aug. 20, 1987 [JP] Japan ................................ 62-207213
Aug. 20, 1987 [JP] Japan ................................ 62-207214
Aug. 20, 1987 [JP] Japan ................................ 62-207215

[51] Int. Cl.$^5$ ......................... G21K 4/00; G03B 42/00
[52] U.S. Cl. ............................... 250/327.2; 250/484.1
[58] Field of Search .......................... 250/327.2, 484.1; 358/110; 382/18, 51

[56] References Cited

U.S. PATENT DOCUMENTS

| | | | |
|---|---|---|---|
| 4,527,060 | 7/1985 | Suzuki et al. | 250/327.2 |
| 4,620,097 | 10/1986 | Tanaka et al. | 250/484.1 |
| 4,638,162 | 1/1987 | Tanaka et al. | 250/484.1 |
| 4,682,028 | 7/1987 | Tanaka et al. | 250/484.1 |
| 4,851,678 | 7/1989 | Adachi et al. | 250/327.2 |

FOREIGN PATENT DOCUMENTS 56-11395 2/1981 Japan .

OTHER PUBLICATIONS

Denshi Tsushin Gakkai Ronbun Sehi (Collected Papers on the Institute of Electronics and Communications Engineers of Japan), '80/4, vol. J63-D, No. 4, pp. 349-356 and '86/9, vol J66-D, No. 9, pp. 1355-1356.

Primary Examiner—Constantine Hannaher
Assistant Examiner—J. Eisenberg
Attorney, Agent, or Firm—Sughrue, Mion, Zinn, Macpeak & Seas

[57] ABSTRACT

A method of judging the presence or absence of a limited irradiation field on a recording medium in the case where a radiation image has been recorded on the recording medium comprises the steps of creating a histogram of image signals detected from the recording medium, and dividing the histogram into small regions by an automatic threshold value selecting process using a discriminant criterion or a standard equivalent to the discriminant criterion. The small region located on the lowest signal level side is divided into a lower level division and a higher level division with respect to a mean image signal level of the small region. The limited irradiation field is judged to be present in the case where spread of the lower level division is wider than spread of the higher level division, and judged to be absent in the case where the spread of the lower level division is narrower than the spread of the higher level division.

9 Claims, 2 Drawing Sheets

METHOD OF JUDGING THE PRESENCE OR ABSENCE OF A LIMITED IRRADIATION FIELD, METHOD OF SELECTING A CORRECT IRRADIATION FIELD, AND METHOD OF JUDGING CORRECTNESS OR INCORRECTNESS OF AN IRRADIATION FIELD

BACKGROUND OF THE INVENTION

1. Field of the Invention

This invention relates to a method of judging whether a limited irradiation field is present or absent on a recording medium such as a stimulable phosphor sheet in the case where a radiation image has been recorded on the recording medium. This invention also relates to a method of selecting a correct irradiation field wherein a correct prospective irradiation field region is selected from a plurality of prospective irradiation field regions in the case where they are present on a recording medium. This invention further relates to a method of judging correctness or incorrectness of an irradiation field in which judgment is made as to whether a prospective irradiation field region is correct or is not correct in the case where at least one prospective irradiation field region is present on a recording medium.

2. Description of the Prior Art

When certain kinds of phosphors are exposed to a radiation such as X-rays, $\alpha$-rays, $\beta$-rays, $\lambda$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and then is exposed to stimulating rays such as a laser beam which cause the stimulable phosphor sheet to emit light in proportion to the stored radiation energy. The light emitted by the stimulable phosphor sheet upon stimulation thereof is detected photoelectrically and converted to electric image signals, image processing is carried out on the electric image signals, and the radiation image of the object is reproduced as a visible image by use of the processed image signals on a recording material such as a photographic film, a display device such as a cathode ray tube (CRT), or the like.

In the aforesaid radiation image recording and reproducing system, in order to improve the image quality, and particularly the diagnostic efficiency and accuracy, of the visible image, image read-out for photoelectrically detecting the light emitted by the stimulable phosphor sheet upon stimulation thereof should be carried out preferably by use of read-out conditions adjusted to appropriate values in accordance with each radiation image, and/or image processing of the image signals preferably should be carried out by use of optimal image processing conditions adjusted in accordance with each radiation image.

One embodiment of the method of adjusting the read-out conditions and/or the image processing conditions such as gradation processing conditions in accordance with each radiation image has been proposed in, for example, Japanese Unexamined Patent Publication No. 58(1983)-67240 whose U.S. equivalent is U.S. Pat. No. 4,527,060. In the proposed embodiment, before final read-out is carried out by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into electric image signals, preliminary read-out for approximately detecting the image information stored on the stimulable phosphor sheet is carried out by use of stimulating rays of a level lower than the level of the stimulating rays used in the final read-out. The read-out conditions (i.e. the read-out conditions for the final read-out, such as a read-out gain and a scale factor) and/or the image processing conditions (such as gradation processing conditions and frequency response processing conditions) are adjusted on the basis of the image signals obtained by the preliminary read-out (hereinafter referred to as preliminary read-out image signals).

As the method of adjusting the read-out conditions for the final read-out on the basis of the preliminary read-out image signals, a novel method has been proposed in, for example, Japanese Unexamined Patent Publication No. 60(1985)-156055 whose U.S. equivalent is U.S. Pat. No. 4,682,028. The proposed method comprises the steps of: determining a histogram of the preliminary read-out image signals (image signal levels), calculating the maximum image signal level Smax and the minimum image signal level Smin of a desired image signal range in the histogram, and adjusting the read-out conditions for the final read-out so that the maximum image signal level Smax and the minimum image signal level Smin correspond respectively to the maximum signal level Qmax and the minimum signal level Qmin of a desired input signal range in an image processing means which are determined by the maximum density Dmax and the minimum density Dmin of a correct density range in the reproduced visible image.

Also, as the method of adjusting the image processing conditions, for example, gradation processing conditions, on the basis of the preliminary read-out image signals, the method as mentioned above may be used by way of example. Specifically, there may be used a method comprising the steps of: determining a histogram of the preliminary read-out image signals, calculating the maximum image signal level Smax and the minimum image signal level Smin of a desired image signal range in the histogram, and adjusting the gradation processing conditions so that the maximum image signal level Smax and the minimum image signal level Smin correspond respectively to the maximum signal level Rmax and the minimum signal level Rmin of a desired input signal range in an image reproduction means (visible image output means) which are determined by the maximum density Dmax and the minimum density Dmin of a correct density range in the reproduced visible image.

The image processing conditions such as the gradation processing conditions may be adjusted based on the image signals obtained by the final read-out as well as the image signals obtained by the preliminary read-out. Also, in this case, it is possible to employ, for example, the method comprising the steps of: determining a histogram of the image signals obtained by the final read-out, calculating Smax and Smin from the histogram, and adjusting the gradation processing conditions so that Smax and Smin correspond respectively to Rmax and Rmin.

On the other hand, in the case where the aforesaid radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are affected adversely by the scattered radiation. Therefore, in the aforesaid radiation image recording and reproducing system, the irradiation field is often limited in the course of recording of a radiation image. However, in the case where image recording is carried out by the limitation of the irradiation field as mentioned above, as shown in FIG. 2, radiation (indicated by dots in FIG. 3) scattered by the object within an irradiation field 14 normally passes outside of a region 12 outside of the irradiation field 14 on a stimulable phosphor sheet 10. The scattered radiation is absorbed and stored on the stimulable phosphor sheet which exhibits high sensitivity, and therefore the histogram of the preliminary read-out image signals includes the image signal level caused by the scattered radiation. Since the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram obtained by the preliminary read-out. Therefore, in the case where Smax and Smin are calculated from the histogram as mentioned above and the read-out conditions for the final read-out are adjusted on the basis of Smax and Smin, the minimum image signal level inside of the irradiation field is not detected as Smin, and that image signal level caused by the scattered radiation outside of the irradiation field is detected as Smin. In general, the minimum image signal level outside of the irradiation field is lower than that inside of the irradiation field. Accordingly, when the minimum image signal level outside of the irradiation field is detected as Smin, signals caused by the scattered radiation not related to diagnosis are taken within a low density range in the final read-out, and the density of the image of the portion related to diagnosis becomes too high. As a result, the image contrast decreases, and it becomes difficult to make an accurate diagnosis.

Namely, in the case where a radiation image is recorded by limiting the irradiation field, radiation scattered by the object passes outside of the irradiation field on the stimulable phosphor sheet, and noise caused by the scattered radiation is contained in the preliminary read-out image signals. Therefore, when the read-out conditions for the final read-out are adjusted based on such preliminary read-out image signals, it is not always possible to adjust the read-out conditions for the final read-out to appropriate values and to obtain a visible image suitable for viewing, particularly for diagnostic purposes.

The aforesaid problem arises in the case where the read-out conditions for the final read-out are adjusted based on the preliminary read-out image signals as mentioned above, and in the case where the image processing conditions such as gradation processing conditions are adjusted based on the preliminary read-out image signals or the final read-out image signals.

Therefore, in the case where the read-out conditions for the final read-out and/or the image processing conditions are to be adjusted based on the preliminary read-out image signals and/or the final read-out image signals by use of the aforesaid method, it is desired to judge whether the irradiation field was limited in the course of image recording on the stimulable phosphor sheet, i.e. whether a limited irradiation field is present or absent on the stimulable phosphor sheet. In the case where the limited irradiation field is present on the stimulable phosphor sheet, the adverse effects of scattered radiation outside of the irradiation field should be eliminated by, for example, employing a value of a level higher by a predetermined amount than the minimum image signal level in the histogram of the image signals in the course of adjustment of Smin from the histogram, or by recognizing the irradiation field by one of irradiation field recognizing methods proposed in, for example, Japanese Unexamined Patent Publication No. 61(1986)-39039 whose U.S. equivalent is U.S. Pat. No. 4,851,678, 62(1987)-15536, and 62(1987)-15537 through 62(1987)-15541, and adjusting the read-out conditions for the final read-out and/or the image processing conditions based on only the preliminary read-out image signals and/or the final read-out image signals inside of the irradiation field.

As mentioned above, judgment as to the presence or absence of a limited irradiation field is necessary in the case where image recording has been carried out by use of the stimulable phosphor sheet and the read-out conditions for the final read-out or the like are to be adjusted. The judgment of the presence or absence of a limited irradiation field is also necessary in various other cases.

SUMMARY OF THE INVENTION

The primary object of the present invention is to provide a method of judging the presence or absence of a limited irradiation field in the case where a radiation image has been recorded on a recording medium such as a stimulable phosphor sheet.

Another object of the present invention is to provide a method of selecting a correct irradiation field, which enables selection of a correct prospective irradiation field region from a plurality of prospective irradiation field regions present on a recording medium.

A further object of the present invention is to provide a method of judging correctness or incorrectness of an irradiation field, which enables judgment as to whether a prospective irradiation field region is correct or is not correct in the case where at least one prospective irradiation field region is present on a recording medium.

The present invention provides a method of judging the presence or absence of a limited irradiation field on a recording medium in the case where a radiation image has been recorded on the recording medium, the method comprising the steps of:

(i) creating a histogram of image signals detected from said recording medium, (ii) dividing said histogram into a plurality of small regions by an automatic threshold value selecting process using a discriminant criterion or a standard equivalent to said discriminant criterion, (iii) dividing the small region located on the lowest signal level side into a lower level division and a higher level division with respect to a mean image signal level of said small region, and (iii) judging that said limited irradiation field is present in the case where the range of said lower level division is wider than the range of said higher level division, and judging that said limited irradiation field is absent in the case where the range of said lower level division is narrower than the range of said higher level division.

The present invention also provides a first method of selecting a correct irradiation field wherein a correct prospective irradiation field region is selected from a plurality of prospective irradiation field regions in the case where they are present on a recording medium carrying a radiation image recorded thereon, the method comprising the steps of:

(i) for each of said prospective irradiation field regions, calculating a degree of class separation $\eta$ for use in discriminant analysis with respect to image signals inside of the prospective irradiation field region on said recording medium and image signals outside of said prospective irradiation field region, and (ii) selecting a prospective irradiation field region in which said degree of class separation $\eta$ is the highest as the correct prospective irradiation field region.

The present invention further provides a second method of selecting a correct irradiation field wherein a correct prospective irradiation field region is selected from a plurality of prospective irradiation field regions in the case where they are present on a recording medium carrying a radiation image recorded thereon, the method comprising the steps of:

(i) for each of said prospective irradiation field regions, calculating a degree of class separation $\eta$ for use in discriminant analysis with respect to image signals inside of the prospective irradiation field region on said recording medium and image signals outside of said prospective irradiation field region, and (ii) selecting a prospective irradiation field region in which said degree of class separation $\eta$ is the highest and, at the same time, is not lower than a predetermined threshold value as the correct prospective irradiation field region.

The present invention still further provides a method of judging correctness or incorrectness of an irradiation field in which judgment is made as to whether a prospective irradiation field region is correct or is not correct in the case where at least one prospective irradiation field region is present on a recording medium carrying a radiation image recorded thereon, the method comprising the steps of:

(i) for each prospective irradiation field region, calculating a degree of class separation $\eta$ for use in discriminant analysis with respect to image signals inside of the prospective irradiation field region on said recording medium and image signals outside of said prospective irradiation field region, and (ii) judging that a prospective irradiation field region in which said degree of class separation $\eta$ is not lower than a predetermined threshold value is correct, and judging that a prospective irradiation field region in which said degree of class separation $\eta$ is lower than the predetermined threshold value is incorrect.

By the term "recording medium" as used herein is meant a medium capable of recording a radiation image thereon, such as a stimulable phosphor sheet. However, the recording medium is not limited to the stimulable phosphor sheet.

By the term "image signals" as used herein are meant the signals detected by reading out a radiation image recorded on a recording medium by any method, for example, the image signals detected by the preliminary read-out or the final read-out from the stimulable phosphor sheet. However, said image signals are not limited to the image signals detected in this manner from the stimulable phosphor sheet.

The division by the automatic threshold value selecting process using the discriminant criterion is carried out by calculating the degree of class separation and dividing at a point where the degree of class separation is the highest. A least-square standard and a correlation standard may be mentioned as the standard equivalent to the discriminant criterion (i.e. the standard mathematically equivalent to the discriminant criterion and providing the same results as the discriminant criterion). The discriminant criterion and the least-square standard are described in "Denshi Tsushin Gakkai Ronbun Shi" (Collected Papers of The Institute of Electronics and Communication Engineers of Japan), '80/4, Vol. J63-D, No. 4, pp. 349–356. The correlation standard is described in "Denshi Tsushin Gakkai Ronbun Shi" (Collected Papers of The Institute of Electronics and Communication Engineers of Japan), '86/9, Vol. J66-D, No. 9, pp. 1355–1356.

The range of the lower level division and the range of the higher level division means the range of the height direction of the image signal level in each division (i.e. in the direction of the axis indicating the image signal level in the histogram), for example, the length (width) in the height direction of the image signal level in each division, a variance of each division, and the like.

The term "case where a plurality of prospective irradiation field regions are present" as used herein embraces the case where a plurality of the irradiation fields (prospective irradiation field regions) are detected by the method of recognizing an irradiation field as mentioned above, and the case where a plurality of the prospective irradiation field regions are set arbitrarily.

The term "degree of class separation $\eta$" as used herein means the discriminant criterion used in discriminant analysis. The degree of class separation $\eta$ may be considered to embrace (as the representative of) the discriminant criterion (=degree of class separation $\eta$) and the standard equivalent to the discriminant criterion (i.e. the standard mathematically equivalent to the discriminant criterion and providing the same results as the discriminant criterion), for example, the least-square standard and the correlation standard.

The term "degree of class separation $\eta$ is the highest" and the term "degree of class separation $\eta$ is the highest and, at the same time, is not lower than a predetermined threshold value" as used herein mean that the degree of class separation $\eta$ in the discriminant criterion or a coefficient of correlation in the correlation standard is the highest, or is the highest and, at the same time, is not lower than the predetermined threshold value in the case where the degree of class separation $\eta$ is the degree of class separation $\eta$ in the discriminant criterion or is the coefficient of correlation in the correlation standard, and mean that a square error is the smallest, or is the smallest and, at the same time, is not larger than a predetermined value in the case where the degree of class separation $\eta$ is the square error in the least square standard.

The term "case where at least one prospective irradiation field region is present" as used herein embraces the case where at least one irradiation field (prospective irradiation field region) is detected by the method of recognizing an irradiation field as mentioned above, and the case where at least one prospective irradiation field region is set arbitrarily.

The term "degree of class separation $\eta$ is not lower than a predetermined threshold value" as used herein means that the degree of class separation $\eta$ in the discriminant criterion or the coefficient of correlation in the correlation standard is not lower than the predetermined threshold value in the case where the degree of class separation $\eta$ is the degree of class separation $\eta$ in the discriminant criterion or is the coefficient of correlation in the correlation standard, and means that the square error is not larger than a predetermined value in the case where the degree of class separation $\eta$ is the square error in the least square standard.

Effects of the method of judging the presence or absence of a limited irradiation field in accordance with the present invention will be described hereinbelow.

As mentioned above, in the case where the image recording is carried out by the limitation of the irradiation field, scattered radiation passes outside of the irradiation field on the recording medium, and image signals caused by scattered radiation are included in the image signals detected from the recording medium. In general, the levels of the image signals caused by scattered radiation are nearly equal to or lower than the minimum image signal level among the levels of the image signals detected inside of the irradiation field. Therefore, in the case where the irradiation field was limited, a histogram of the image signals as indicated by, for example, the solid line in FIG. 1 which is obtained in the case where the irradiation field was not limited changes such that the image signals caused by scattered radiation appear on the low level side and the low level part of the histogram extends toward the lower level side as indicated by the chain line in FIG. 1.

Therefore, the presence or absence of the limited irradiation field can be detected by studying the low level part of the histogram and judging whether the low level part is or is not extended by scattered radiation toward the lower level side.

The histogram is divided into a plurality of small regions, at positions where the separability is the maximum, by the automatic threshold value selecting process using the discriminant criterion or the like, the small region on the lowest level side among the small regions is divided into a higher level division and a lower level division with respect to a mean image signal level of said small region, and the higher level division and the lower level division are compared with each other. In the case where the irradiation field was not limited, the range in the height direction of the image signal level is narrower in the lower level division than in the higher level division. On the other hand, in the case where the irradiation field was limited, the range of the lower level division increases markedly so that the range becomes wider in the lower level division than in the higher level division.

Accordingly, it is possible to judge whether the limited irradiation field is present or absent by dividing the small region into the higher level division and the lower level division and the comparing the spread of the lower level division and the spread of the higher level division with each other.

With the method of judging the presence or absence of a limited irradiation field in accordance with the present invention wherein the small region located on the lowest signal level side is divided into a lower level division and a higher level division by the utilization of the automatic threshold value selecting process using the discriminant criterion or the like, and the spread of the lower level division and the spread of the higher level division are compared with each other, the presence or absence of the limited irradiation field can be recognized accurately.

Effects of the first and second methods of selecting a correct irradiation field will be described hereinbelow.

The degree of class separation $\eta$ represents the separability with respect to the image signal levels of a plurality of regions in the case where an image is divided into a plurality of the regions. A higher degree of class separation $\eta$ indicates higher separability.

Basically, the region inside of the irradiation field and the region outside of the irradiation field in an image are, respectively, the region where radiation is irradiated and the region where no radiation is irradiated, and therefore can be separated definitely from each other with respect to the image signal level. Therefore, in the case of division of an image into two regions, the separability is the highest in the case where the image is divided into the region inside of the irradiation field and the region outside of the irradiation field.

Therefore, in the case where the degree of class separation $\eta$ with respect to the region inside of the prospective irradiation field region and the region outside of the prospective irradiation field region is calculated for each prospective irradiation field region, a prospective irradiation field region in which the degree of class separation $\eta$ is the highest can be recognized as the correct prospective irradiation field region, i.e. the prospective irradiation field region coinciding with or closest to the true irradiation field.

The first method of selecting a correct irradiation field in accordance with the present invention constituted based on the aforesaid finding is suitable for the case where a prospective irradiation field region coinciding with or close to the true irradiation field is always present among a plurality of prospective irradiation field regions or the probability of the presence of the prospective irradiation field region coinciding with or close to the true irradiation field among a plurality of the prospective irradiation field region is very high.

The second method of selecting a correct irradiation field in accordance with the present invention is constituted based on the aforesaid finding, and broadens the range of application over the first method of selecting a correct irradiation field in accordance with the present invention. The second method is suitable also for the case where it is not clear whether a prospective irradiation field region coinciding with or close to the true irradiation field is present or is not present among a plurality of prospective irradiation field regions.

Specifically, in the case where a prospective irradiation field region coinciding with or close to the true irradiation field is not present among a plurality of prospective irradiation field regions and a prospective irradiation field region is selected as to be correct for no other reason than that the degree of class separation $\eta$ is the highest, the prospective irradiation field region is selected as to be correct even though it is different from and far apart from the true irradiation field or no irradiation field is present. In order to eliminate this problem, in the second method of selecting a correct irradiation field in accordance with the present invention, a prospective irradiation field region where the degree of class separation $\eta$ is the highest and, at the same time, is not lower than the predetermined threshold value is selected as the correct prospective irradiation field region.

The degree of class separation $\eta$ represents the separability as mentioned above, and the level of the degree of class separation $\eta$ means the degree of coincidence of each prospective irradiation field region with the true irradiation field. Therefore, in the case where a prospective irradiation field region where the degree of class separation $\eta$ is not lower than the predetermined threshold value and, at the same time, is the highest is selected as the correct prospective irradiation field region, it is possible to eliminate the problem that a prospective irradiation field region is selected as to be correct even though the prospective irradiation field region is different from and far apart from the true irradiation field or no irradiation field is present.

With the first method of selecting a correct irradiation field in accordance with the present invention wherein the degree of class separation $\eta$ whose higher value means higher closeness to the true irradiation field is calculated and a prospective irradiation field region in which the degree of class separation $\eta$ is the highest is selected as the correct prospective irradiation field region, the correct prospective irradiation field region can be selected accurately.

Also, with the second method of selecting a correct irradiation field in accordance with the present invention wherein a prospective irradiation field region in which the degree of class separation $\eta$ is the highest and, at the same time, is not lower than a predetermined threshold value is selected as the correct prospective irradiation field region, it is possible to eliminate the problem that a prospective irradiation field region is selected as to be correct even though the prospective irradiation field region is different from, and far apart from, the true irradiation field or no irradiation field is present, and the correct prospective irradiation field region can be selected more accurately.

Effects of the method of judging correctness or incorrectness of an irradiation field in accordance with the present invention will be described hereinbelow.

As mentioned above, the level of the degree of class separation $\eta$ means the degree of correctness of each prospective irradiation field region (i.e. the degree of coincidence of each prospective irradiation field region with the true irradiation field).

Therefore, in the case where the value of the degree of class separation $\eta$ for the true irradiation field, i.e. the value of the degree of class separation $\eta$ at the time an image is divided into the region inside of the true irradiation field and the region outside of the true irradiation field, is approximately ascertained in advance by way of example, it is possible to know a critical level of the degree of class separation $\eta$ for judging that the prospective irradiation field region is correct (i.e. coincides with or very close to the true irradiation field) on the basis of the ascertained value. Accordingly, it is possible to judge whether each prospective irradiation field region is correct or is not correct by determining the value of $\eta$ enabling the judgment that the prospective irradiation field region is correct, and studying whether $\eta$ of each prospective irradiation field region is larger than or smaller than the predetermined value.

With the method of judging correctness or incorrectness of an irradiation field in accordance with the present invention, the degree of class separation $\eta$ whose level means the degree of coincidence with the true irradiation field is calculated for each prospective irradiation field region, judgment is made as to whether each prospective irradiation field region is correct or incorrect based on whether the calculated degree of class separation $\eta$ is or is not lower than the predetermined threshold value. Therefore, as mentioned above, it is possible to accurately judge whether each prospective irradiation field region is correct or incorrect by adjusting the predetermined threshold value to an appropriate value.

DESCRIPTION OF THE PREFERRED EMBODIMENTS

The present invention will be described hereinbelow in further detail with reference to the accompanying drawings.

An embodiment of the method of judging the presence or absence of a limited irradiation field in accordance with the present invention first will be described below.

The embodiment described below is applied to the case where the preliminary read-out is carried out for a stimulable phosphor sheet carrying a radiation image stored thereon, and judgment is made as to whether a limited irradiation field is present or absent on the stimulable phosphor sheet on the basis of the obtained preliminary read-out image signals.

First, the preliminary read-out image signals representing the radiation image are detected by carrying out the aforesaid preliminary read-out for the stimulable phosphor sheet carrying the radiation image stored thereon. Specifically, the stimulable phosphor sheet is scanned by stimulating rays for the preliminary read-out which cause the stimulable phosphor sheet to emit light in proportion to the stored radiation energy, and the emitted light is detected by a photoelectric conversion means to obtain the electric image signals corresponding to the optical amounts of the light emitted by respective scanning points (i.e. picture elements) on the stimulable phosphor sheet.

Then, a histogram of the image signals is created, and is divided into a plurality of small regions by the automatic threshold value selecting process using the discriminant criterion. The number of the small regions may be adjusted as desired to be, for example, two, three, four or more.

One embodiment of division into the small regions is to divide the recorded image into the small regions in a number equal to the number of image portions constituting the image.

In general, a single recorded image is composed of a background portion upon which radiation impinges directly without passing through an object, a soft tissue image portion such as a skin image, a bone image portion, and a bone overlap image portion where bones overlap one upon the other. The image signals representing the respective image portions are located respectively within image signal (image signal level) ranges having predetermined widths, and the respective ranges are deviated from one another in the direction of the image signal level (they partially overlap one upon another) such that, for example, the background portion, the soft tissue image portion, the bone image portion and the bone overlap image portion are located in this sequence from a higher level side toward a lower level side. Also, the histogram of the overall image is composed of a group of image signal histograms of a plurality of the aforesaid image portions deviated in the direction of the image signal level. In the case where the image signal histogram of the overall image is divided into the small regions in a number equal to the number of the image portions constituting the aforesaid recorded image at positions where the separability is the highest in the direction of the image signal level, the respective small regions correspond to the histograms of the respective image portions. This correspondence is advantageous for subsequent processing. The number of the image portions constituting the recorded image can be known in advance based on the information on the image recording portion of the object (such as the head, chest, or abdomen) and the image recording method (such as plain image recording or contrasted image recording).

In this embodiment, the objective recorded image is composed of four image portions. Therefore, the histogram of the preliminary read-out image signals of the overall image is created, and is divided into four small regions at positions where the separability is the highest by the utilization of the automatic threshold value selecting process using the discriminant criterion. The method of the division will be described hereinbelow with reference to FIG. 1.

Figure 1:
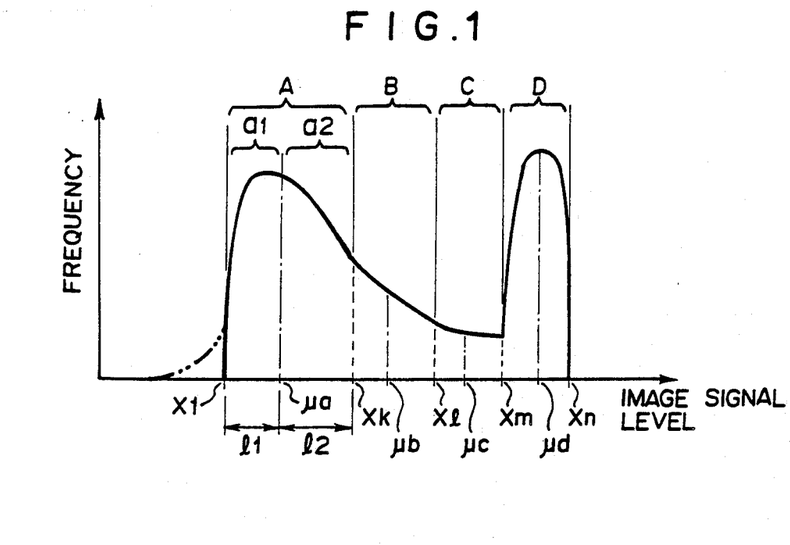
FIG. 1 is a graph showing the image signal histogram in the case where the irradiation field is not limited.

FIG. 1 shows the histogram of the preliminary read-out image signals representing the recorded image. First, the histogram is divided into small regions A, B, C and D bounded by arbitrary image signal levels Xk, Xl, and Xm in the direction of the horizontal axis (i.e. in the height direction of the image signal level), and the degree of class separation R is calculated by the formula expressed as $$R = \omega a \ (\mu a - \mu T)^2 + \omega b \ (\mu b - \mu T)^2 + \omega c \ (\mu c - \mu T)^2 + \omega d \ (\mu d - \mu T)^2$$

In this formula, $\omega a$ through $\omega d$ denote the ratios of the number of picture elements in the small regions A, B, C, and D respectively to the total number of the picture elements, where $\omega a + \omega b + \omega c + \omega d = 1$. Also, $\mu a$ through $\mu d$ and $\mu T$ respectively denote the mean values (mean image signal levels) of the image signal levels in the small regions A, B, C, and D and the overall region, respectively, and are expressed as $$\mu a = \frac{1}{\sum_{i=1}^{k} f(xi)} \sum_{i=1}^{k} \times i \cdot f(xi)$$

$$\mu b = \frac{1}{\sum_{i=k+1}^{l} f(xi)} \sum_{i=k+1}^{l} \times i \cdot f(xi)$$

$$\mu c = \frac{1}{\sum_{i=l+1}^{m} f(xi)} \sum_{i=l+1}^{m} \times i \cdot f(xi)$$

$$\mu d = \frac{1}{\sum_{i=m+1}^{n} f(xi)} \sum_{i=m+1}^{n} \times i \cdot f(xi)$$

$$\mu T = \frac{1}{\sum_{i=1}^{n} f(xi)} \sum_{i=1}^{n} \times i \cdot f(xi)$$

where $f(xi)$ denotes the frequency at an image signal level $xi$.

The aforesaid degree of class separation R is calculated by changing the arbitrary adjusted image signal levels Xk, Xl, and Xm, and the histogram is divided into the small regions A, B, C, and D by Xk, Xl, and Xm at the time the degree of class separation R is the maximum.

Then, among the four small regions thus divided, the small region A located on the lowest level side is considered. The small region A is divided into a lower level division a1 and a higher level division a2 bounded by the mean image signal level $\mu a$ of the small region A.

The range of the lower level division a1 and the spread of the higher level division a2 in the height direction of the image signal level (in the direction of the horizontal axis indicating the image signal level) are investigated. It is judged that a limited irradiation field is present in the case where the range of the lower level division a1 is wider than the range of the higher level division a2, and it is judged that no limited irradiation field is present in the case where the former is narrower than the latter.

Various values may be employed as the values for indicating the range of the lower level division a1 and the higher level division a2. For example, as shown in FIG. 1, lengths (widths) l1 and l2 of the divisions a1 and a2 in the height direction of the image signal level may be employed for this purpose. Of course, l1 is the distance from X1 to $\mu a$, and l2 is the distance from $\mu a$ to Xk. Instead of l1 and l2, a variance $\delta a1^2$ and a variance $\delta a2^2$ in the divisions a1 and a2 may be employed. In the case where $\mu a = Xp$, the variance $\delta a1^2$ and the variance $\mu a2^2$ are expressed as, $$\delta a_1^2 = \frac{1}{Na_1} \sum_{i=j}^{p} (Xi - \overline{X}a_1) \cdot f(Xi)$$

$$\delta a_2^2 = \frac{1}{Na_2} \sum_{i=P+1}^{k} (Xi - \overline{X}a_2) \cdot f(Xi)$$

where $\overline{X}a1$ and $\overline{X}a2$ respectively denote the mean image signal levels in the divisions a1 and a2, and Na1 and Na2 respectively denote the total number of image signals (total number of picture elements) in the divisions a1 and a2.

Figure 2:
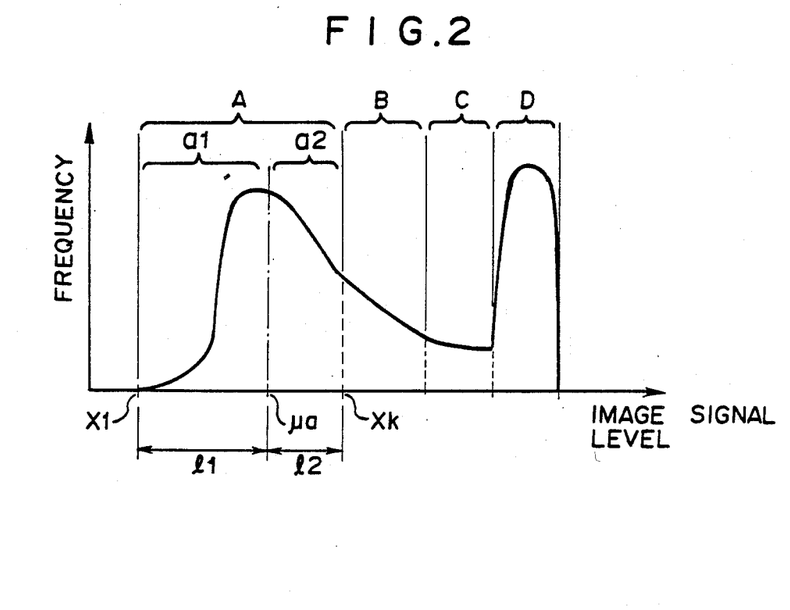
FIG. 2 is a graph showing the image signal histogram in the case where the irradiation field is limited.
Figure 3:
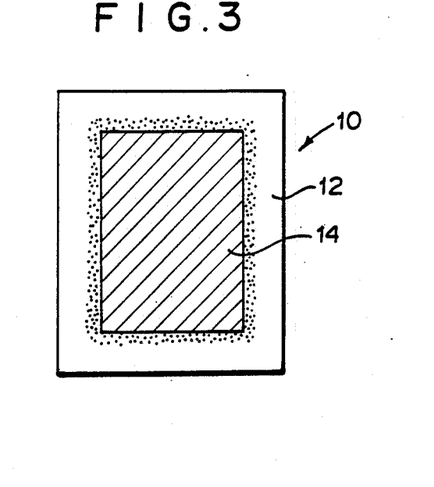
FIG. 3 is a schematic view showing the stimulable phosphor sheet on which an irradiation field is present.

In the histogram shown in FIG. 1 wherein no limited irradiation field is present, $l1 < l2$ and $\delta a1^2 < \delta a2^2$. However, in the case where a limited irradiation field is present, the image signals caused by scattered radiation appear at the low level part of the histogram, the low level part of the histogram is extended toward the lower level side as indicated by the chain line in FIG. 1. FIG. 2 shows the histogram in this case. In the case of the histogram shown in FIG. 2, the lower level division a1 and the higher level division a2 of the small region A on the lowest level side become as shown. Particularly, the lower level division a1 ranges widely toward the lower level side in the height direction of the image signal level, and therefore the range of the lower level division a1 becomes wider than the range of the higher level division a2. For example, $l1>l2$ and $\delta a1^2 > \delta a2^2$.

After the presence or absence of the limited irradiation field is judged by comparing the range of the division a1 and the range of the division a2 with each other, the result of the judgment can be utilized for various purposes. For example, in the case where the limited irradiation field is found to be present, the lower level part of the image signal histogram is the noise part caused by scattered radiation, and therefore a value of a level higher by a predetermined amount than the minimum image signal level in the histogram may be employed, instead of the minimum image signal level, in the course of adjustment of the minimum image signal level Smin of the aforesaid desired image signal range. In this case, the difference between the range of the division a1 and the range of the division a2 (i.e. $l1-l2$ or $\delta a1^2 - \delta a2^2$) corresponds to the extent of the range of image signal level toward the lower level side caused by scattered radiation, and therefore the amount of shift of Smin toward the higher level side should preferably be increased preferably as the difference between the range of the division a1 and the range of the division a2 increases. Also, in the case where it is judged that the limited irradiation field is present, the irradiation field may be recognized by, for example, the irradiation field recognizing method as mentioned above, and Smax and Smin may be calculated from the histogram of only the image signals inside of the irradiation field.

The histogram of the preliminary read-out image signals in the aforesaid embodiment may be replaced by a histogram of the final read-out image signals, and the method of judging the presence or absence of a limited irradiation field in accordance with the present invention is applicable also to a histogram of image signals detected from a recording medium different from the stimulable phosphor sheet.

Also, instead of dividing by the automatic threshold value selecting process using the discriminant criterion, the division may be carried out by the automatic threshold value selecting process using the other standards.

An embodiment of the first method of selecting a correct irradiation field in accordance with the present invention will be described hereinbelow.

The embodiment described below is for the case where a correct prospective irradiation field region is to be selected from a plurality of prospective irradiation field regions when the preliminary read-out image signals representing the radiation image are detected by carrying out the aforesaid preliminary read-out for the stimulable phosphor sheet carrying the radiation image stored thereon (specifically, the stimulable phosphor sheet is scanned by stimulating rays for the preliminary read-out which cause the stimulable phosphor sheet to emit light in proportion to the stored radiation energy, and the emitted light is detected by a photoelectric conversion means to obtain the electric image signals corresponding to the optical amounts of the light emitted by respective scanning points, i.e. picture elements, on the stimulable phosphor sheet), and a plurality of irradiation fields (prospective irradiation field regions) are detected as a result of irradiation field detection using an irradiation field recognizing method, for example, the method as mentioned above on the basis of the preliminary read-out image signals.

Figure 4:
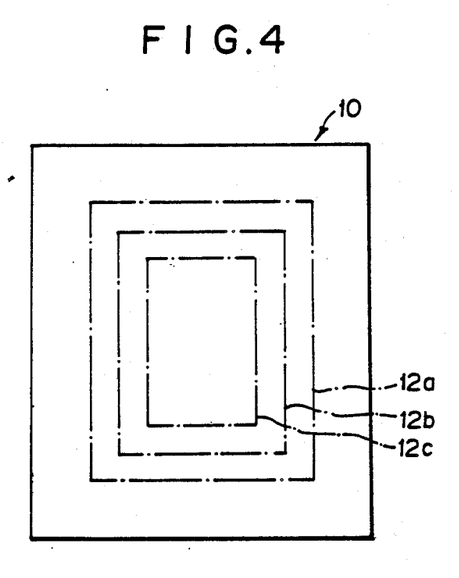
FIG. 4 is a plan view showing the stimulable phosphor sheet on which a plurality of prospective irradiation field regions are present.

FIG. 4 shows a stimulable phosphor sheet 10 carrying a radiation image stored thereon. The chain lines on the stimulable phosphor sheet 10 indicate prospective irradiation field regions 12a, 12b, and 12c detected by the aforesaid irradiation field recognizing method.

First, for each of the prospective irradiation field regions 12a, 12b, and 12c, a degree of class separation $\eta$ for use in discriminant analysis with respect to the preliminary read-out image signals inside of the prospective irradiation field region on the stimulable phosphor sheet 10 and the preliminary read-out image signals outside of the prospective irradiation field region is calculated by the formula expressed as, $$\eta = \delta B^2 / \delta T^2$$
$$\delta B^2 = \omega i \cdot \omega o (\mu i - \mu o)^2$$

In this formula, $\omega i$ and $\omega o$ respectively denote the ratio of the number of picture elements inside of the prospective irradiation field region to the total number of picture elements and the ratio of the number of picture elements outside of the prospective irradiation field region to the total number of picture elements, where $\omega i + \omega o = 1$. Also, $\mu i$ and $\mu o$ respectively denote the mean value (mean image signal level) of the image signal levels at all of the picture elements inside of the prospective irradiation field region and the mean value (mean image signal level) of the image signal levels at all of the picture elements outside of the prospective irradiation field region, and $\delta T^2$ denote the variance in the recording region (the overall region on the stimulable phosphor sheet 10) composed of the regions inside and outside of the prospective irradiation field region.

By way of example, as for the prospective irradiation field region 12a, the area inside of the prospective irradiation field region denotes the range inward from the chain line indicating the region 12a, i.e. the range surrounded by the chain line, and the area inside of the prospective irradiation field region denotes the range outward from the chain line.

After degrees of class separation $\eta a$, $\eta b$, and $\eta c$ are calculated respectively for the prospective irradiation field regions 12a, 12b, and 12c, the degrees of class separation $\eta a$, $\eta b$, and $\eta c$ are compared with one another, and a prospective irradiation field region in which the degree of class separation $\eta$ is the highest is selected as the correct prospective irradiation field region.

As mentioned above, the degree of class separation $\eta$ in each prospective irradiation field region indicates the degree of separability of the regions inside and outside of the prospective irradiation field region from each other. Also, in the case of a prospective irradiation field region coinciding with the true irradiation field, the degree of class separation $\eta$ is the highest. Therefore, the correct prospective irradiation field region can be selected accurately by selecting the prospective irradiation field region in which the degree of class separation $\eta$ is the highest as the correct prospective irradiation field region.

An embodiment of the second method of selecting a correct irradiation field in accordance with the present invention will be described hereinbelow.

Basically, in this embodiment, the degree of class separation η is calculated for each prospective irradiation field region, and the prospective irradiation field region in which the degree of class separation η is the highest is selected as the correct prospective irradiation field region as in the embodiment of the first method of selecting a correct irradiation field in accordance with the present invention. However, in this embodiment, in the course of the selection, a prospective irradiation field region in which the degree of class separation η is the highest and, at the same time, is not lower than a predetermined threshold value is selected as the correct prospective irradiation field region.

As mentioned above, in the case where a prospective irradiation field region is selected as to be correct for no other reason than that the degree of class separation η is the highest, there is the risk of the prospective irradiation field region being selected as to be correct even though it is different from and far apart from the true irradiation field or no irradiation field is present. In such a case, the value of the degree of class separation η in the prospective irradiation field region is not so large even though the degree of class separation η is the highest. Therefore, the aforesaid problem can be eliminated by adjusting a predetermined threshold value, and preventing the selection as the correct prospective irradiation field region in the case where the degree of class separation η is lower than the predetermined threshold value even though it is the highest.

The value of the degree of class separation η in the case where the prospective irradiation field region coincides with the true irradiation field can be predicted experimentally to some extent. Therefore, the aforesaid predetermined threshold value may be adjusted based on the predicted value or the like.

Also, in the embodiment of the second method of selecting a correct irradiation field in accordance with the present invention, no correct prospective irradiation field region may be selected. (In the embodiment of the first method of selecting a correct irradiation field in accordance with the present invention, a single correct prospective irradiation field region is always selected.)

The correct prospective irradiation field region (irradiation field) selected by the first and second methods of selecting a correct irradiation field may be utilized in various manners. For example, it may be utilized in the case where the read-out conditions for the final read-out and/or the image processing conditions are to be adjusted based on only the preliminary read-out image signals inside of the irradiation field, in the case where the image processing conditions are to be adjusted based on only the final read-out image signals inside of the irradiation field, and in the case where the read-out region is limited to the region inside of the irradiation field as disclosed in Japanese Unexamined Patent Publication No. 60(1985)-120346.

The aforesaid embodiments of the first and second methods of selecting a correct irradiation field in accordance with the present invention are applied to the case where a plurality of irradiation fields (prospective irradiation field regions) are detected in the recognition of an irradiation field by various irradiation field recognizing methods. However, in the first and second methods of selecting a correct irradiation field in accordance with the present invention, a plurality of prospective irradiation field regions may be the ones that are adjusted arbitrarily. In this case, the first and second methods of selecting a correct irradiation field in accordance with the present invention are substantially equivalent to a method of detecting the irradiation field.

In the aforesaid embodiments of the first and second methods of selecting a correct irradiation field in accordance with the present invention, the final read-out image signals may be employed instead of the preliminary read-out image signals. The first and second methods of selecting a correct irradiation field in accordance with the present invention are also applicable to the case where the image signals are the ones that are detected from a recording medium different from the stimulable phosphor sheet.

Also, instead of the degree of class separation (discriminant criterion) η, the least square standard or the correlation standard equivalent to the discriminant criterion may be employed. In the aforesaid embodiments, the degree of class separation η is equal to $\delta B^2/\delta T^2$. However, $\delta T^2$ is the same in every prospective irradiation field region in a single recorded image, and therefore $\delta B^2$ may be processed as the degree of class separation η.

An embodiment of the method of judging correctness or incorrectness of an irradiation field in accordance with the present invention will be described hereinbelow.

The embodiment described below is for the case where judgment is to be made as to whether a plurality of prospective irradiation field regions are correct or incorrect when the preliminary read-out image signals representing the radiation image are detected by carrying out the aforesaid preliminary read-out for the stimulable phosphor sheet carrying the radiation image stored thereon (specifically, the stimulable phosphor sheet is scanned by stimulating rays for the preliminary read-out which cause the stimulable phosphor sheet to emit light in proportion to the stored radiation energy, and the emitted light is detected by a photoelectric conversion means to obtain the electric image signals corresponding to the optical amounts of the light emitted by respective scanning points, i.e. picture elements, on the stimulable phosphor sheet), and a plurality of irradiation fields (prospective irradiation field regions) are detected as a result of irradiation field detection using an irradiation field recognizing method, for example, the method as mentioned above on the basis of the preliminary read-out image signals.

In this embodiment, the degrees of class separation $\eta a$, $\eta b$, and $\eta c$ are calculated respectively for the prospective irradiation field regions 12a, 12b and 12c in the same manner as in the first method of selecting a correct irradiation field in accordance with the present invention. Then, a prospective irradiation field region in which the degree of class separation η is not lower than a predetermined threshold value Th is judged to be correct, and a prospective irradiation field region in which the degree of class separation η is lower than a predetermined threshold value Th is judged to be incorrect.

As mentioned above, the level of the degree of class separation η in each prospective irradiation field region means the degree of coincidence of each prospective irradiation field region with the true irradiation field. It is possible to ascertain a critical level of the degree of class separation η for judging that the prospective irradiation field region is correct on the basis of the value of the degree of class separation η experimentally detected for the true irradiation field or the like. Accordingly, it is possible to accurately judge whether each prospective irradiation field region is correct or is not correct by determining the value of η, which enables the judgment that the prospective irradiation field region is correct, on the basis of the value of the degree of class separation η for the true irradiation field, using the value thus determined as the predetermined threshold value, and judging whether the degree of class separation η of each prospective irradiation field region is or is not lower than the predetermined threshold value.

The results of the judgment are considered to be such that, for example, all of the prospective irradiation field regions are incorrect, a single prospective irradiation field region is correct, or two or more prospective irradiation field regions are correct. In the case where two or more prospective irradiation field regions are found to be correct, it is considered that a single irradiation field is present and two or more prospective irradiation field regions are very close to the irradiation field, or that two or more irradiation fields are present and, as a result, two or more correct prospective irradiation field regions are present.

The prospective irradiation field region which is judged to be correct may be utilized for various purposes as mentioned above.

The aforesaid embodiment of the method of judging correctness or incorrectness of an irradiation field in accordance with the present invention is applied to the case where a plurality of irradiation fields (prospective irradiation field regions) are detected in the recognition of an irradiation field by various irradiation field recognizing methods. However, also when only a single prospective irradiation field region is found to be present, judgment can be made in accordance with the present invention as to whether the single prospective irradiation field region is or is not correct. The method of judging correctness or incorrectness of an irradiation field in accordance with the present invention is also applicable to the case where a single prospective irradiation field region or a plurality of prospective irradiation field regions are the ones that are arbitrarily adjusted. In this case, the method of judging correctness or incorrectness of an irradiation field in accordance with the present invention is substantially equivalent to a method of detecting the irradiation field.

In the aforesaid embodiment of the method of judging correctness or incorrectness of an irradiation field in accordance with the present invention, the final read-out image signals may be employed instead of the preliminary read-out image signals. The method of judging correctness or incorrectness of an irradiation field in accordance with the present invention is also applicable to the case where the image signals are the ones that are detected from a recording medium different from the stimulable phosphor sheet.

Also, instead of the degree of class separation (discriminant criterion) η, the least square standard or the correlation standard equivalent to the discriminant criterion may be employed. In the aforesaid embodiment of the method of judging correctness or incorrectness of an irradiation field in accordance with the present invention, the degree of class separation η is equal to $\delta B^2/\delta T^2$. However, $\delta T^2$ is the same in every prospective irradiation field region in a single recorded image, and therefore $\delta B^2$ may be processed as the degree of class separation η.

It should be understood that the present invention is not limited to the aforesaid embodiments and can be embodied in various other types.

I claim:

1. A method of judging the presence or absence of a limited irradiation field on a recording medium in the case where a radiation image has been recorded on the recording medium, the method comprising the steps of:
   (i) creating a histogram of image signals detected from said recording medium,
   (ii) dividing said histogram into a plurality of small regions by an automatic threshold value selecting process using a discriminant criterion or a standard equivalent to said discriminant criterion,
   (iii) dividing the small region located on the lowest signal level side into a lower level division and a higher level division with respect to a mean image signal level of said small region, and iv judging that said limited irradiation field is present in the case where a range of said lower level division is wider than a range of said higher level division, and judging that said limited irradiation field is absent in the case where the range of said lower level division is narrower than the range of said higher level division.

2. A method of judging the presence or absence of a limited irradiation field as defined in claim 1, wherein said range of said lower level division is the length of said lower level division in the height direction of the image signal level or the variance of said lower level division, and said range of said higher level division is the length of said higher level division in the height direction of the image signal level or the variance of said higher level division.

3. A method of judging the presence or absence of a limited irradiation field as defined in claim 1, wherein said recording medium is a stimulable phosphor sheet carrying the radiation image stored thereon, and said image signals are obtained by exposing said stimulable phosphor sheet to stimulating rays which cause said stimulable phosphor sheet to emit light in proportion to the stored radiation energy and photoelectrically detecting the emitted light.

4. A method of selecting a correct irradiation field, wherein a correct prospective irradiation field region is selected from a plurality of prospective irradiation field regions in the case where they are present on a recording medium carrying a radiation image recorded thereon, the method comprising the steps of:
   (i) for each of said prospective irradiation field regions, calculating a degree of class separation η for use in discriminant analysis with respect to image signals inside of the prospective irradiation field region on said recording medium and image signals outside of said prospective irradiation field region, and
   (ii) selecting a prospective irradiation field region in which said degree of class separation η is the highest as the correct prospective irradiation field region.

5. A method of selecting a correct irradiation field as defined in claim 4, wherein said recording medium is a stimulable phosphor sheet carrying the radiation image stored thereon, and said image signals are obtained by exposing said stimulable phosphor sheet to stimulating rays which cause said stimulable phosphor sheet to emit light in proportion to the stored radiation energy and photoelectrically detecting the emitted light.

6. A method of selecting a correct irradiation field, wherein a correct prospective irradiation field region is selected from a plurality of prospective irradiation field regions in the case where they are present on a recording medium carrying a radiation image recorded thereon, the method comprising the steps of:
   (i) for each of said prospective irradiation field regions, calculating a degree of class separation $\eta$ for use in discriminant analysis with respect to image signals inside of the prospective irradiation field region on said recording medium and image signals outside of said prospective irradiation field region, and
   (ii) selecting a prospective irradiation field region in which said degree of class separation $\eta$ is the highest and, at the same time, is not lower than a predetermined threshold value as the correct prospective irradiation field region.

7. A method of selecting a correct irradiation field as defined in claim 6, wherein said recording medium is a stimulable phosphor sheet carrying the radiation image stored thereon, and said image signals are obtained by exposing said stimulable phosphor sheet to stimulating rays which cause said stimulable phosphor sheet to emit light in proportion to the stored radiation energy and photoelectrically detecting the emitted light.

8. A method of judging correctness or incorrectness of an irradiation field in which judgment is made as to whether a prospective irradiation field region is correct or is not correct in the case where at least one prospective irradiation field region is present on a recording medium carrying a radiation image recorded thereon, the method comprising the steps of:
   (i) for each prospective irradiation field region, calculating a degree of class separation $\eta$ for use in discrimination analysis with respect to image signals inside of the prospective irradiation field region on said recording medium and image signals outside of said prospective irradiation field region, and
   (ii) judging that a prospective irradiation field region in which said degree of class separation $\eta$ is not lower than a predetermined threshold value is correct, and judging that a prospective irradiation field region in which said degree of class separation $\eta$ is lower than the predetermined threshold value is incorrect.

9. A method of judging correctness or incorrectness of an irradiation field as defined in claim 8, wherein said recording medium is a stimulable phosphor sheet carrying the radiation image stored thereon, and said image signals are obtained by exposing said stimulable phosphor sheet to stimulating rays which cause said stimulable phosphor sheet to emit light in proportion to the stored radiation energy and photoelectrically detecting the emitted light.

* * * * *